United States Patent
Porterfield

(10) Patent No.: US 6,993,612 B2
(45) Date of Patent: Jan. 31, 2006

(54) ARBITRATION METHOD FOR A SOURCE STROBED BUS

(75) Inventor: A. Kent Porterfield, New Brighton, MN (US)

(73) Assignee: Micron Technology, Inc., Boise, ID (US)

(*) Notice: Subject to any disclaimer, the term of this patent is extended or adjusted under 35 U.S.C. 154(b) by 490 days.

(21) Appl. No.: 09/730,780

(22) Filed: Dec. 7, 2000

(65) Prior Publication Data

US 2002/0152343 A1 Oct. 17, 2002

(51) Int. Cl.
- G06F 13/00 (2006.01)
- G06F 13/368 (2006.01)
- H04L 3/02 (2006.01)

(52) U.S. Cl. .............. 710/110; 710/119; 710/242; 710/305; 370/462

(58) Field of Classification Search .............. 710/14, 710/100, 107, 110, 114, 119, 113, 242, 305, 710/62, 240, 317; 370/462, 432, 376, 421, 370/447, 537; 709/225; 713/300; 326/56; 711/141

See application file for complete search history.

(56) References Cited

U.S. PATENT DOCUMENTS

| | | | | |
|---|---|---|---|---|
| 4,387,425 A | * | 6/1983 | El-Gohary | 709/225 |
| 4,402,040 A | * | 8/1983 | Evett | 710/119 |
| 5,132,967 A | * | 7/1992 | Kalajainen | 370/462 |
| 5,349,690 A | * | 9/1994 | Frame et al. | 710/107 |
| 5,428,753 A | * | 6/1995 | Kondo et al. | 710/107 |
| 5,469,438 A | * | 11/1995 | Baumert et al. | 370/432 |
| 5,502,821 A | * | 3/1996 | Nguyen et al. | 710/100 |
| 5,546,587 A | * | 8/1996 | Silver | 710/242 |
| 5,796,960 A | | 8/1998 | Bicevskis et al. | |
| 5,867,670 A | * | 2/1999 | Kim et al. | 710/113 |
| 5,890,015 A | * | 3/1999 | Garney et al. | 710/62 |
| 5,907,689 A | * | 5/1999 | Tavallaei et al. | 710/110 |
| 5,991,833 A | | 11/1999 | Wandler et al. | |

(Continued)

Primary Examiner—Glenn A. Auve
Assistant Examiner—Christopher E. Lee
(74) Attorney, Agent, or Firm—Dickstein Shapiro Morin & Oshinsky LLP

(57) ABSTRACT

A hub based computer system having a central hub that communicates with a plurality of satellite devices over respective link buses. Each link bus is substantially the same and adheres to a predefined link bus protocol. The satellite devices are also connected to industry standard buses/devices. The central hub also communicates with a processor and system memory over additional buses. Each link bus includes a status line that allows each device connected to the same link bus to request control of the bus. The link bus protocol establishes a window in which the status signal may convey arbitration request information in a time-multiplexed manner. The protocol further includes a method of determining whether control of the bus can be transferred to a different device. Each device takes part in the decision process and thus, the arbitration method of the invention is decentralized.

55 Claims, 10 Drawing Sheets

U.S. PATENT DOCUMENTS

| | | |
|---|---|---|
| 6,029,223 A | 2/2000 | Klein |
| 6,047,349 A | 4/2000 | Klein |
| 6,070,215 A | 5/2000 | Deschepper et al. |
| 6,092,219 A | 7/2000 | Porterfield |
| 6,094,700 A | 7/2000 | Deschepper et al. |
| 6,128,743 A * | 10/2000 | Rothenbaum ............... 713/300 |
| 6,346,828 B1 * | 2/2002 | Rosen et al. ................. 326/56 |
| 6,401,142 B1 * | 6/2002 | Williams et al. .............. 710/14 |
| 6,442,632 B1 * | 8/2002 | Hayek et al. ............... 710/119 |
| 6,516,375 B1 * | 2/2003 | Ajanovic et al. ........... 710/305 |
| 6,539,444 B1 * | 3/2003 | Kondo et al. ............. 710/110 |
| 6,609,171 B1 * | 8/2003 | Singh et al. ................ 710/305 |
| 2002/0112119 A1 | 8/2002 | Halbert et al. |

* cited by examiner

ARBITRATION METHOD FOR A SOURCE STROBED BUS

FIELD OF THE INVENTION

The invention relates to computer systems, and more particularly to an arbitration method for a source strobed computer bus.

BACKGROUND OF THE INVENTION

Several of today's computer system architectures employ a source strobed bus and method to transfer data between devices. In a typical source strobe architecture, the transmitting device transmits to the receiving device a clock signal/strobe and data. The strobe alerts the receiving device that valid data has been transmitted over the bus. Computer bus architectures such as AGP (accelerated graphics port), DDR SDRAM (double data rate synchronous dynamic random access memory), and RDRAM (Rambus random access memory) utilize source strobes in this manner.

A source strobe data bus is an efficient mechanism for transferring large amounts of data on a minimum number of pins or connections between devices. In the typical source strobe computer architecture, one device connected to the source strobed bus continuously serves as a bus master while the other devices continuously serve as bus slaves. In this type of architecture, the master always controls access to the source strobed bus. Thus, the typical source strobed bus would not require bus arbitration since the same bus master is always in control of the bus.

It is desirable, however, to extend a source strobed bus computer architecture to allow for multiple or different devices to become the master of the bus. That is, instead of appointing one device as the continuous bus master, each device connected to the bus will have the opportunity to request and become the master of the bus at some point in time. By allowing any one of multiple devices to serve as a bus master, however, would require an arbitration scheme to decide which device has control of the source strobed bus at a given time. Typical arbitration schemes involve the use of a separate dedicated arbitration device whose sole responsibility is to arbitrate control of the bus between the other devices connected to the bus. This dedicated arbitration device adds expense and delays to the system since an additional device is connected to, and communicating over, the bus. Thus, there is a desire and need to implement an arbitration method in a source strobed bus architecture that does not use a separate dedicated arbitration device and that allows any device connected to the bus to become the bus master.

SUMMARY OF THE INVENTION

The invention provides an arbitration method in a source strobed bus architecture that does not use a separate dedicated arbitration device and that allows any device connected to the bus to become the bus master.

The invention provides an arbitration method in a source strobed bus architecture that minimizes a number of integrated circuit (IC) pins. Arbitration between two devices requires only one pin and this pin can also be used for other purposes since information is time-multiplexed between the devices.

The above and other features and advantages are achieved by a hub based computer system having a central hub that communicates with a plurality of satellite devices over respective link buses. Each link bus is substantially the same and adheres to a predefined link bus protocol. The satellite devices are also connected to industry standard buses/devices and the central hub also communicates with a processor cluster and system memory over respective processor and memory buses. Thus, all components within the system are capable of communicating with each other through the hub. Each link bus includes a status line that allows each device connected to the same link bus to request control of the bus. The link bus protocol establishes a window in which the status signal may convey arbitration request information in a time-multiplexed manner. The protocol further includes a method of determining whether control of the bus can be transferred to a different device. Each device takes part in the decision process and thus, the arbitration method of the invention is decentralized. The invention dispenses with the need for a dedicated arbitration device, which substantially reduces costs and delays in the system.

BRIEF DESCRIPTION OF THE DRAWINGS

The above and other advantages and features of the invention will be more clearly understood from the following detailed description of the invention, which is provided in connection with the accompanying drawings in which.

DETAILED DESCRIPTION OF THE PREFERRED EMBODIMENTS

Figure 1:
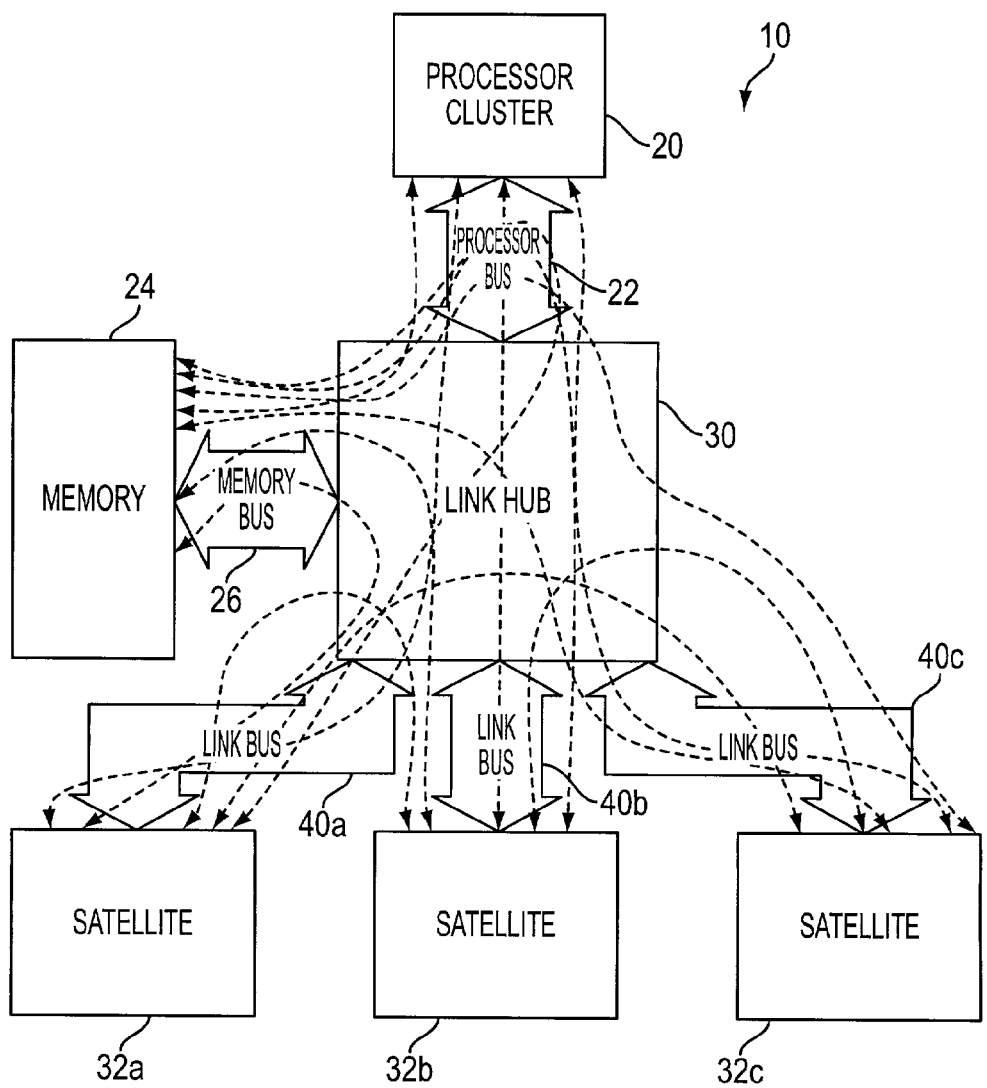
FIG. 1 is a hub based computer system constructed in accordance with an exemplary embodiment of the invention.

FIG. 1 is a hub based computer system 10 utilizing link buses 40a, 40b, 40c (collectively referred to herein as "link buses 40") in accordance with an exemplary embodiment of the invention. The system 10 includes a processor cluster 20, a memory device 24, a link hub 30 and a plurality of satellite devices 32a, 32b, 32c (collectively referred to herein as "satellite devices 32"). The processor cluster 20 may contain one or many processor units. Although not required to practice the invention, if more than one processing unit is contained within the cluster 20, they are preferably identical to each other. The satellite devices 32 can be bridges or hubs to industry standard buses, such as e.g., PCI, PCI-X and AGP, or the devices 32 can be other components typically found in a computer system. The devices 32 can be connected to one or more I/O devices if so desired.

The link hub 30 is connected to the processor cluster 20 by a dedicated processor bus 22. The link hub 30 is connected to the memory device 24 by a dedicated memory bus 26. It is desirable to used dedicated processor and memory buses 22, 26 to minimize any latencies on transfers to/from the processor cluster 20 and to/from the memory device 24. The link hub 30 is connected to each satellite device 32a, 32b, 32c by a link bus 40a, 40b, 40c (collectively referred to herein as "link buses 40"). Each link bus 40a, 40b, 40c is substantially the same. As will be described below in more detail, each link bus 40a, 40b, 40c adheres to a predefined link bus protocol, which makes the interface between the link hub 30 and the devices 32 generic. With these connections to the link hub 30, every component in the system can communicate with each other through the hub 30. Possible communication paths between the system components are represented by the dashed-lines on FIG. 1. It should be appreciated that more than one satellite device 32 can be connected to a particular link bus 40, if desired, and the invention is not to be limited solely to the use of one satellite device 32 per link bus 40.

As will become apparent, the use of the link buses 40 and link bus protocol allows the invention to implement a decentralized arbitration method. The decentralized arbitration method dispenses with the need to connect a dedicated arbitration device to each link bus 40. This will substantially decrease the cost of the system 10 by removing at least one unnecessary component (i.e., a dedicated arbitration device). The decentralized arbitration method also substantially reduces the delays attributable to a centralized/dedicated arbitration device, which improves the overall performance of the system 10.

It is desirable that the system 10 be a high performance, I/O intensive computer system. For example, the system 10 may be a server computer system or a computer workstation. It should be apparent that the invention is not limited to a particular type of environment/system or to particular devices 32 used in the system 10. All that is required to practice the invention is to provide a link bus 40 between the link hub 30 and the satellite devices 32 that must communicate with other satellite devices 32, processor cluster 20 or memory device 24. In addition, each satellite device and the link hub 30 must adhere to the link bus protocol.

A brief description of the link bus 40 is now provided. A more detailed description of the link bus 40, as well as the link bus protocol, will be provided below with respect to FIGS. 4–10. Briefly, the link bus 40 is a low pin count, high bandwidth bus that is used to transfer data and exchange messages between the components in the system 10. In a preferred embodiment, the link bus 40 consists of eight or sixteen command/address/data lines, two source strobe clock signal lines and a status signal line (L_ST). Communications over the link bus 40 adhere to a link bus protocol that is described below in more detail.

The link bus is scaleable, and configurable to support high bandwidths such as e.g., 1 giga-byte per second (GB/s) and 500 mega-bytes per second (MB/s). The link bus 40 preferably uses a quad pumping technique that transfers command, address and data information four times per clock period. That is, in a preferred embodiment, the link bus 40 is a quad pumped bus. It should be noted that the link bus 40 could use double pumping (i.e., transfers information two times per clock period) or a single pumping techniques if so desired. Thus, the invention is not limited to a link bus 40 that is a quad pumped bus.

Figure 2:
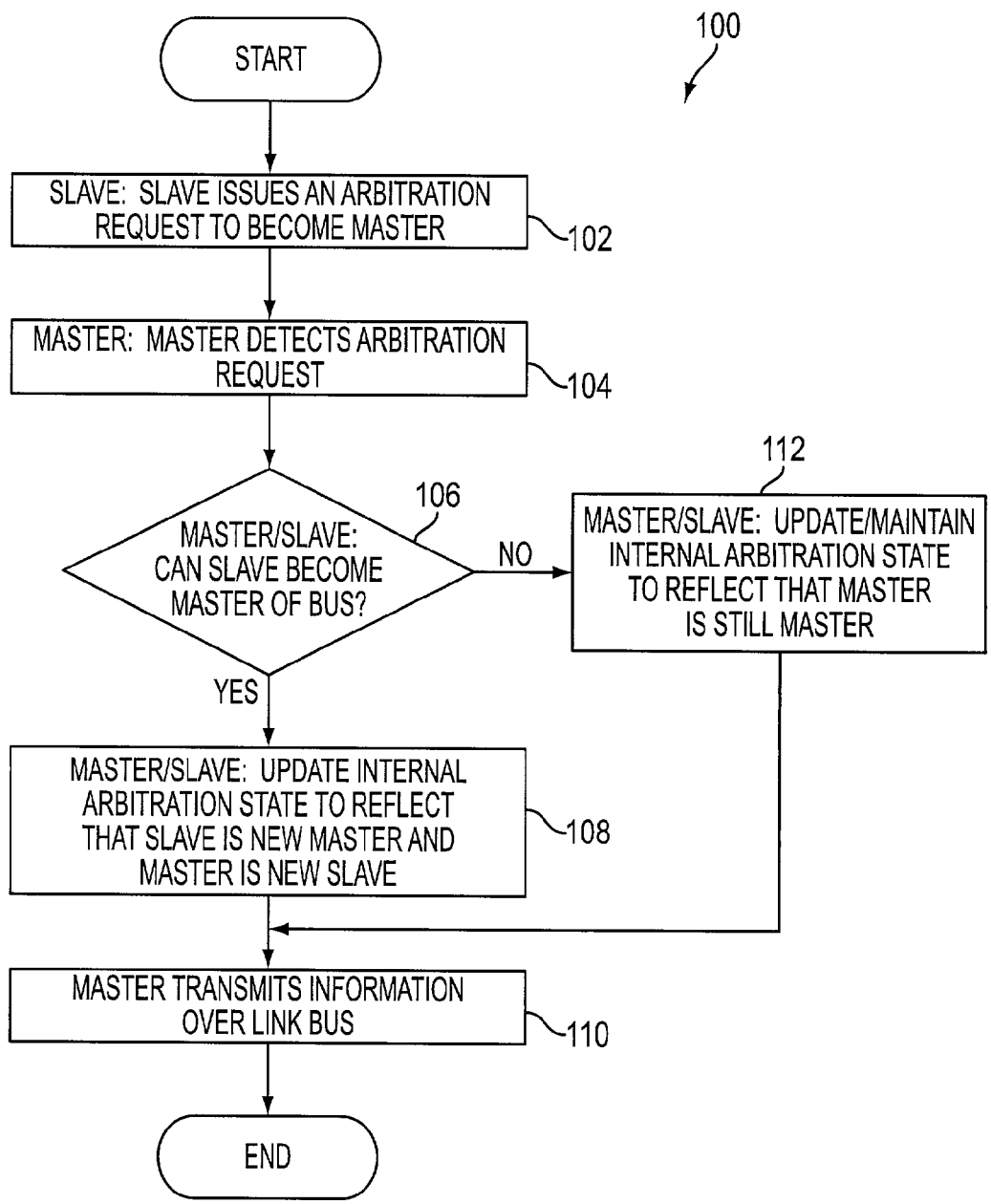
FIG. 2 is an exemplary arbitration method used in the system illustrated in FIG. 1.
Figure 3:
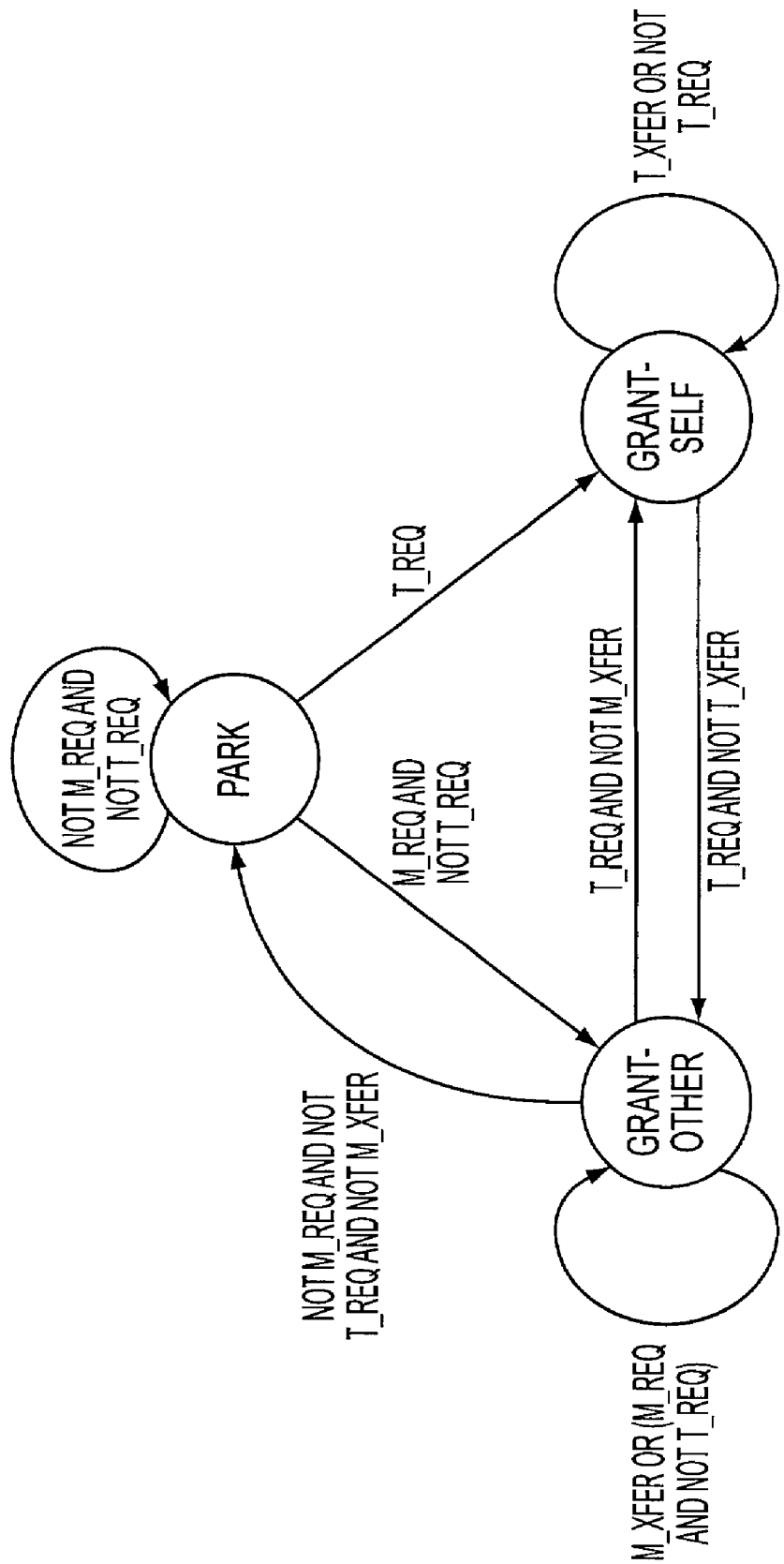
FIG. 3 is an exemplary arbitration state diagram used by the method illustrated in FIG. 2.

Referring now to FIGS. 2 and 3, an exemplary arbitration method 100 used in the system 10 (FIG. 1) is now described. The method 100 is implemented through the use of respective link buses between each satellite device and the link hub and the link bus protocol described in detail below. Essential to the method 100 is the arbitration states defined by the link bus protocol. FIG. 3 illustrates an exemplary set of arbitration states that can be utilized by the link bus protocol to practice the invention.

As will become apparent, each device on a link bus is given the opportunity to arbitrate for control of link bus. The link bus protocol establishes a round-robin arbitration method without exceptions. Each device will have a fair opportunity to control and access the link bus. There is no central arbitration point which decides who is granted the bus. There is no dedicated arbitration device either. Instead, the arbitration is decentralized with each device observing certain state information (FIG. 3) to decide which of the devices is the bus master. A device that is not currently the bus master is referred to herein as the slave. Often times the slave is the target of a data transfer. The slave may request to become a bus master by time multiplexing an arbitration request on the link status signal L_ST (as will be described below in more detail with reference to FIGS. 7–10).

Each device on a link bus will track the state of the bus in accordance with the link bus protocol. FIG. 3 illustrates three exemplary states that are tracked by each device connected to the link bus to perform the arbitration method 100. The Park state indicates that the current owner of the bus has no requests to issue, and the other devices have not indicated that they request the bus. The Grant-Self state indicates that the current owner of the bus is issuing transfers. The Grant-Other state indicates that the another device currently owns the bus. Each device changes between these states by observing certain status information. Because the link bus uses quad-pumped source clocking to issue requests, and time multiplexing to issue status, a distinction must be made concerning observed status. The current bus master knows that a transfer is taking place on the link bus several cycles before the slave can observe the transfer status. Likewise, the current slave(s) may know that it wishes to arbitrate for the bus many clocks before the arbitration request is actually observed on the link status signal L_ST.

Table I identifies exemplary internal status values that will cause changes in the state machine of FIG. 3. The status values and the arbitration states are utilized by the method 100 to arbitrate a link bus in accordance with the invention.

TABLE I

| Status | Description |
| --- | --- |
| M_REQ | The current bus master has a request pending for a new transaction. |
| M_XFER | Defines that a data transfer is in progress as seen by the current master. M_XFER is valid from the time the request packet is sent in the core logic, to the time the last datum as seen in the core logic. |
| T_REQ | The current target has issued a bus request on L_ST, and the current master has observed it. |
| T_XFER | Defines that a data transfer is in progress as seen by the current target. T_XFER is valid from the time the request packet is seen in the core logic, to the time the last datum as seen in the core logic. |

Referring to FIG. 2, at step 102 the device that is attempting to gain control of the link bus, e.g., the current slave device, issues an arbitration request on the link status line L_ST. At step 104 the device currently in control of the link bus, e.g., the master, detects the arbitration request on the link status line L_ST. Once the master has detected the request, and once the slave waits a specified period of time to allow the master to detect the request (described below), both the master and the slave determine whether the current slave can become the new master (step 106). That is, both the master and slave are involved in the arbitration decision.

To make this determination, the master and the slave must determine what their respective arbitration state is (FIG. 2) and what their current internal status is (Table I). This can be done by referencing a table, register or other arbitration information stored on the satellite device. For example, the arbitration state machine (FIG. 2) and how the state machine changes based on the internal status values can be stored in a table or other type of database that is accessible by the status values. Both the master and slave would also store their current state, which is modified during the method 100 of the invention. The stored information can reside in software, hardware or a combination of hardware and software if so desired.

If at step 106 the master and slave determine that the current slave cannot become the bus master, the method continues at step 112. At step 112 both the master and slave maintain or update their internal status and arbitration states to reflect that the slave has requested control of the bus, but did not become the new master and thus, the current master remains the master. If at step 106 the master and slave determine that the current slave can become the bus master, the method continues at step 108. At step 108 both the master and slave update their internal status and arbitration states to reflect that the slave has requested control of the bus, has become the new master of the link bus and that the master is now the new slave. At step 110, the bus master (whether it is the original master or the new master) transmits information over the link bus in accordance with the link bus protocol. The timing of exemplary arbitration requests and bus grant possible scenarios is discussed below with reference to FIGS. 7–10.

Thus, the method 100 of the invention allows each device connected to a link bus to arbitrate the bus. This decentralized arbitration method 100 of the invention alleviates the need to have a dedicated arbitration device in the system because each device is taking part in the arbitration decision process. This reduces the cost of the system by eliminating an unnecessary component. The method 100 also reduces any latency associated with the arbitration process and bus transactions since it removes additional communications from the bus. Thus, the method 100 improves overall system performance.

Referring to FIGS. 4–10, an exemplary link bus and link bus protocol are now described. It should be noted that memory transfers will most likely make up the majority of the transfers across the link bus. Burst operations form the vast majority of transfers from the satellite devices as I/O devices, but partial reads/writes shall also be supported. It is desirable for burst transfers to be aligned on 64-byte boundaries. If a PCI-X device communicates over the link bus, the device will indicate it's intention to transfer up to 4K bytes and if PCI devices are used, PCI pre-fetching can also support bursts greater than 64-bytes. Thus, it is desirable for the link bus to include a mechanism to request 4K bytes of data per request. Partial transfers will transfer less than the minimum burst size. These transfers are primarily partial writes with byte enables. Byte enables must then be encoded in the link bus request phase.

In a preferred implementation of the link bus protocol, each satellite device will appear to software as a bridge of some sort. This allows a simple address decode model for each of the satellite devices. For example, in systems including PCI buses, each satellite device will report as a PCI-PCI bridge and in systems using PCI-X buses, each satellite device will report as a PCI-X-PCI-X bridge. In these example systems, only the south bridge, which may itself be a satellite device, will report as a different device. The PCI bridge model works well to decode transfers from the satellite device going upstream to the link hub. The link hub will, by necessity, need to know the addresses mapped in each of the satellite devices in order to move transfers downstream, and in a lateral direction (peer to peer transfers).

In PCI systems, for example, PCI configuration address space is used to allocate memory resources, as well as other configuration attributes, in the system. Registers within the PCI configuration space are used to define memory and I/O address spaces. This configuration information is used to decide addresses of transfers going both upstream and downstream from the link hub. Addresses that are going downstream must fall within a programmed address range while addresses going upstream must fall outside a programmed address range. Due to the hub based architecture of the system, configuration information must exist in the upstream device (e.g., link hub) and the downstream device (e.g., satellite device). This means that the function of a PCI-PCI bridge, for example, is performed by two independently operating devices—one device initiating downstream transfers and one device initiating upstream transfers.

Thus, the same configuration information must exist in both the satellite device and the link hub. One method of distributing configuration information in a hub based architecture is described in co-pending application Ser. No. 09/730,608, entitled "Link Bus for a Hub Based Computer Architecture," which is hereby incorporated by reference in its entirety.

As noted above, once the link hub and the various devices are configured, data transfers can be made throughout the system. Because some of today's (and future) industry standard buses support split transactions, it is desirable for the link bus protocol to support split transactions as well. For example, the PCI-X standard supports split-transactions to free up the bus. A split-transaction request is issued, and some time later the target of the original request issues a split completion. This is similar to the deferred request of some processor families, which would then be responded to by the target using a defer reply. The split-transaction mechanism is an elegant way to free up the bus for other transactions while a target is kept busy performing the transaction request. The link bus protocol also utilizes the split-transaction mechanism.

Some additional industry standard rules shall also be observed by the link bus protocol. For example, PCI-X includes a status bit that indicates the transfer can use relaxed ordering rules. This will speed up transfers by eliminating buffer flushing along the data path. It is desirable that the link bus protocol include relaxed order status. In addition, PCI-X includes a status bit that indicates the transfer does not need to perform a snoop operation on the processor caches. In a cached system, snooping is performed to find any modified data in the caches. That is, find the freshest data in the caches. Snooping is also used to expel any data in the caches so that newer/fresher data can be transferred (a write) succinctly. Snooping is a method used to ensure coherency of memory in a system employing memory cache. Transfers of this type may proceed directly to memory without snooping the processor caches. It is desirable that the link bus protocol include a "no snooping" option as well.

In one embodiment, the link bus consists of an 8-bit or a 16-bit command/address/data bus L_CAD and two source strobed clock signals L_STB, L_STB_N as shown below in Table II. The link bus status signal L_ST is used to exchange flow control information between devices. Optionally, byte enables may be issued coincident with each data phase. Exemplary formats for the L_CAD, L_STB, L_STB_N and L_ST signals will be described below in more detail.

TABLE II

| Signal | Type | Count | Description |
| --- | --- | --- | --- |
| L_CAD[15:0] | In/Out | 16 | Link bus command/address/data |
| L_CAD[17:16] | In/Out | 2 | Optional byte enables for write data. Not needed for all link bus configurations. |
| L_STB | In/Out | 1 | Link bus strobe |
| L_STB_N | In/Out | 1 | Link bus strobe Not |
| L_ST | In/Out | 1 | Link bus status |

Figure 4:
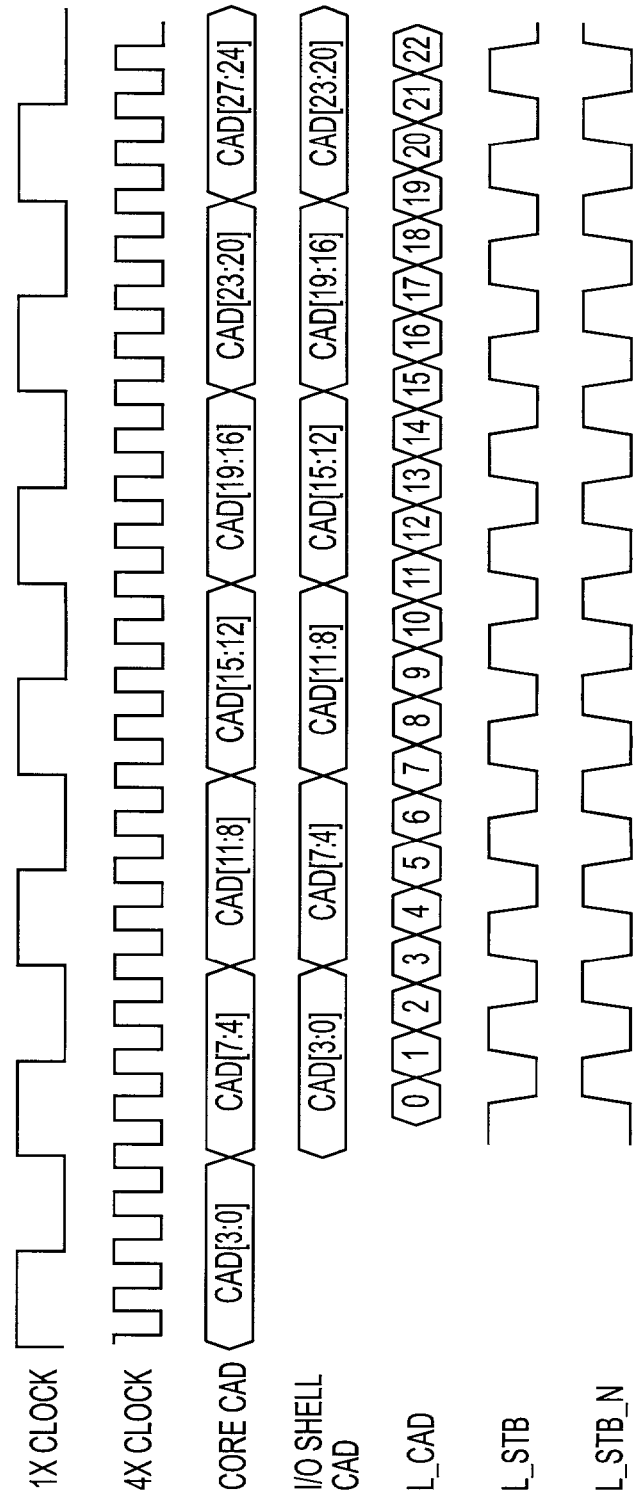
FIGS. 4–6 are timing diagrams illustrating the timing of the transmit and receipt of command/address/data in accordance with an exemplary protocol of the invention.

FIG. 4 is an exemplary diagram illustrating the timing of the transferring of command/address/data onto the link bus by one of the satellite devices (or link hub). In one embodiment of the link bus, the system clock will be distributed internally by a phase-locked loop (PLL) capable of generating both a "1X" clock (i.e., data transferred one-time per clock tick) and "4X" clock (i.e., data transferred four-times per clock tick). FIG. 4 illustrates the 1X and 4X clock signals, command/address/data ("CAD") from the core logic of the device, CAD latched in an I/O shell and the link bus signals L_CAD, L_STB and L_STB_N.

In the transmit waveform of the link bus, CAD is issued from the core logic on the device in the 1X clock domain and captured in an I/O macro (i.e., I/O shell) in the 1X clock domain. Once in the I/O macro, the CAD is multiplexed from the 1X clock domain to the 4X clock domain. Once in the 4X domain, the CAD is driven onto the link bus as the L_CAD signals. The source strobed clock signals L_STB, L_STB_N are also driven onto the link bus to generate strobes at two-times the system clock frequency. The source strobed clock signals L_STB, L_STB_N are driven at two-times the system clock frequency so the receiver only has to work with one edge of each strobe L_STB, L_STB_N, eliminating concerns about strobe asymmetry.

In an exemplary embodiment, the link bus is a quad pumped bus and two strobe signals L_STB, L_STB_N are operating at twice the clock frequency, providing a total of four strobe events for each clock cycle. In this exemplary embodiment, the link bus protocol will not allow fewer than four strobes per clock cycle. 64-bits of data may therefore be transferred every clock cycle in a 16-bit link bus configuration. Similarly, in a 8-bit link bus configuration, 32-bits of data may be transferred per clock cycle. It is also desirable for data to be transferred along 8-byte address boundaries. Thus, a 16-bit link bus configuration may transfer 8-bytes in one clock cycle, while the 8-bit link bus transfers data in two clocks cycles.

Figure 5:
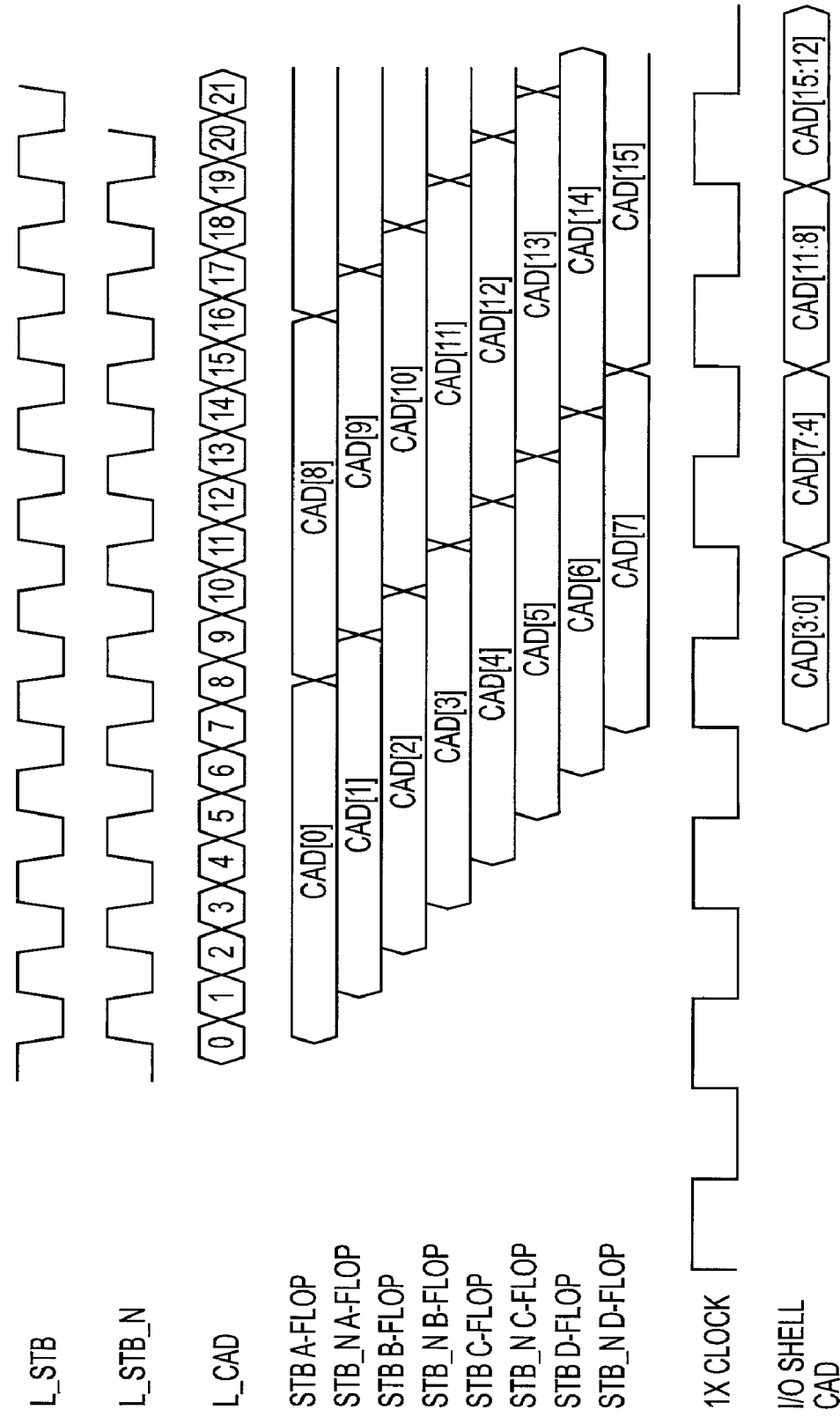

Once the signals are transmitted onto the link bus, another device may receive the signals in accordance with the link bus protocol. Referring now to FIG. 5, the timing of the receipt of the link bus command/address/data L_CAD and source strobed clock signals L_STB, L_STB_N is now described. The target device will receive the L_CAD and strobes L_STB, L_STB_N after some delay. The received information should then be synchronized back into the 1X clock domain. For each strobe of the source strobed clock signals L_STB, L_STB_N, there is an A, B, C and D latch or flip-flop in the receiver I/O macro. L_CAD information is clocked into each flip-flop as CAD information in a ping-pong fashion so that timing may be met. The CAD is then transmitted to the 1X clock domain in the I/O macro by assembling each of the data in the A B, C, D flops into a wider data path in accordance with rules that will meet timing requirements between the strobe domain and the 1X clock domain. Once in the 1X clock domain, the CAD is available to the receiver's core logic.

Figure 6:
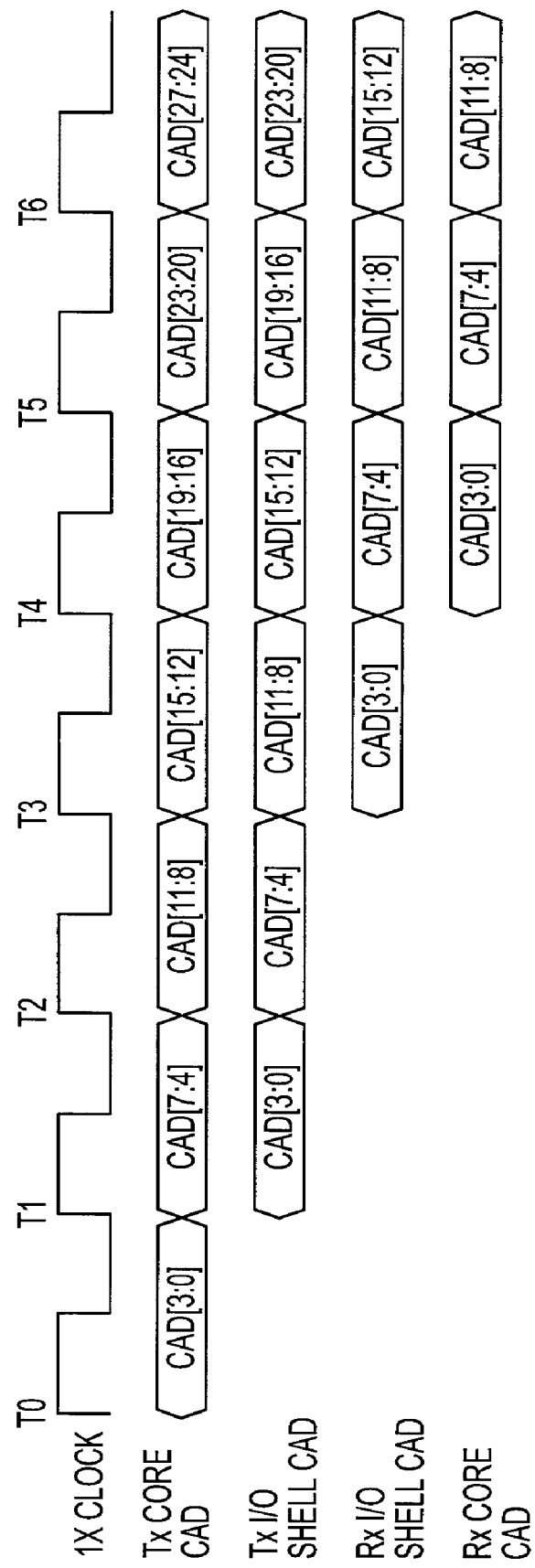

FIG. 6 shows a generalized view of the transfer of command/address/data from the time that it is available in the core logic of the transmitting device, to the time that it is available to the core logic of the receiving device. This generalized view does not show the intermediate steps of quad pumping across the link bus. For the purpose of illustration, it is assumed that CAD is quad pumped as illustrated in FIGS. 4 and 5. It should be noted that it takes five clock cycles from the time a state decision is made in the transmitter core (time T0), to the time the receiver core can act on that information (time T4). It should be appreciated that the above described timing diagrams are mere illustrations of exemplary embodiments of the link bus and link bus protocols and that the invention is not limited to any specific timing.

It is desirable for data to be paced only on certain naturally aligned data boundaries (ADB's). An ADB is an amount of data that may be transferred across the link bus in a certain number of clock cycles. In one embodiment, the ADB is the amount of data that may be transferred across the link bus in eight clock cycles. Examples of ADBs would include 64-bytes for a 16-bit link bus and 32-bytes for an 8-bit link bus. The pacing of information on the link bus is described in co-pending application Ser. No. 09/730,774, entitled "Method of Pacing and Disconnecting Transfers on a Source Strobed Bus," which is hereby incorporated by reference in its entirety.

As noted above, in addition to the clock forwarded quad-pumped command/address/data L_CAD portion of the link bus, there is a single-bit link status signal L_ST. The link status signal L_ST time multiplexes arbitration and data flow information. For every transaction, one device connected to the link bus will serve as a bus master and the other device will serve as the bus slave. Data may be stalled by either the master, or the slave by defining certain windows during a transfer in which the status may be driven and observed. In a typical situation, the transferring device serves as the master, while the receiving device (i.e., the target) serves as the slave. The target may request its desire to become the link master by time multiplexing an arbitration request on the status signal L_ST (as described above with respect to FIG. 2).

Each device connected to a particular link bus is given the opportunity to arbitrate for the link bus. Typically, when a source strobed bus is used, one device (e.g., memory controller) always serves as the bus master, while the other device (e.g., memory device) always serves as the bus slave. In the present invention, however, either device can serve as the master. In one exemplary embodiment of the invention, the link bus follows a round-robin arbitration method. Due to the split-transaction nature of the link bus, both devices must have a fair opportunity to access the link bus to prevent deadlocks. There is no central arbitration point which decides who is granted the bus. Instead, the arbitration is decentralized with each device observing certain state information to decide which of the devices is the bus master. A device that is not currently the bus master (i.e., the target) may request to become a bus master by time multiplexing an arbitration request on the link status signal L_ST. The arbitration protocol allows bus parking, and back-to-back transfers to minimize latencies and improve performance.

As there is no central arbitration point in the link bus, each device on the link bus must perform arbitration in an independent distributed fashion. The link bus slave or target has the opportunity to issue an arbitration request T_REQ (Table I) using time-multiplexing techniques on the link bus status signal L_ST. Time multiplexing the arbitration request will cause some initial latency to acquire the bus when the bus is idle, but other than that, the latency is minimized. Because the current bus master does not have to time multiplex it's own arbitration (M_REQ in Table I), the arbitration latency for the current bus master is effectively nothing. This actually encourages back-to-back requests on the link bus, which improves bus utilization.

After issuing an arbitration request on the link bus status line L_ST, the request cannot be rescinded by the slave. The slave must continue to request the bus at each window of the time-multiplexed status bus. After winning the bus, the slave becomes the master. If the new master decides for some reason that it no longer needs the link bus, it should, at a minimum, issue a NOP (no operation) request on the link bus. The new slave will not have the opportunity to issue an arbitration request of its own until the new master issues at least one transfer request. This eliminates the case where the bus is re-arbitrated to the original master before the current new master has an opportunity to issue its bus transaction due to housekeeping reasons.

A link master may issue a new request immediately after the last data transfer of the previous request if the other device has not won arbitration. No idle cycles are inserted between requests. When a link master finishes the current request, has no new requests to issue, and the other device has not arbitrated for and won the bus, then the current master is said to be parked on the bus. When transitioning to the parked state, it is important that the master issue a special idle command IDLE on the link bus. This command will put the capture flops in the target I/O shells in a known state (all high), as the Link bus strobes will not fire off after this command. This allows the target to detect activity on the link bus when the state of the I/O shell flops change from all 1's to some other state. This is an important mechanism because the activity on the link bus can be detected in the clock domain of the core, as opposed to toggle flops on the link strobes L_STB, L_STB_N allowing for cleaner, more predictable internal strobe clock distribution. One exemplary method of using the idle command IDLE and change detection to detect activity on the link bus is described in application Ser. No. 07/730,775, now U.S. Pat. No. 6,651,122, entitled "Method Of Detecting A Source Strobe Event Using Change Detection," which is hereby incorporated by reference in its entirety.

In one embodiment of the invention, when the system is reset, the upstream link device is initialized as the link bus master. In an exemplary embodiment, the upstream device is the device closest to the memory controller. In most embodiments, this will be the link hub 30 (FIG. 1).

Figure 7:
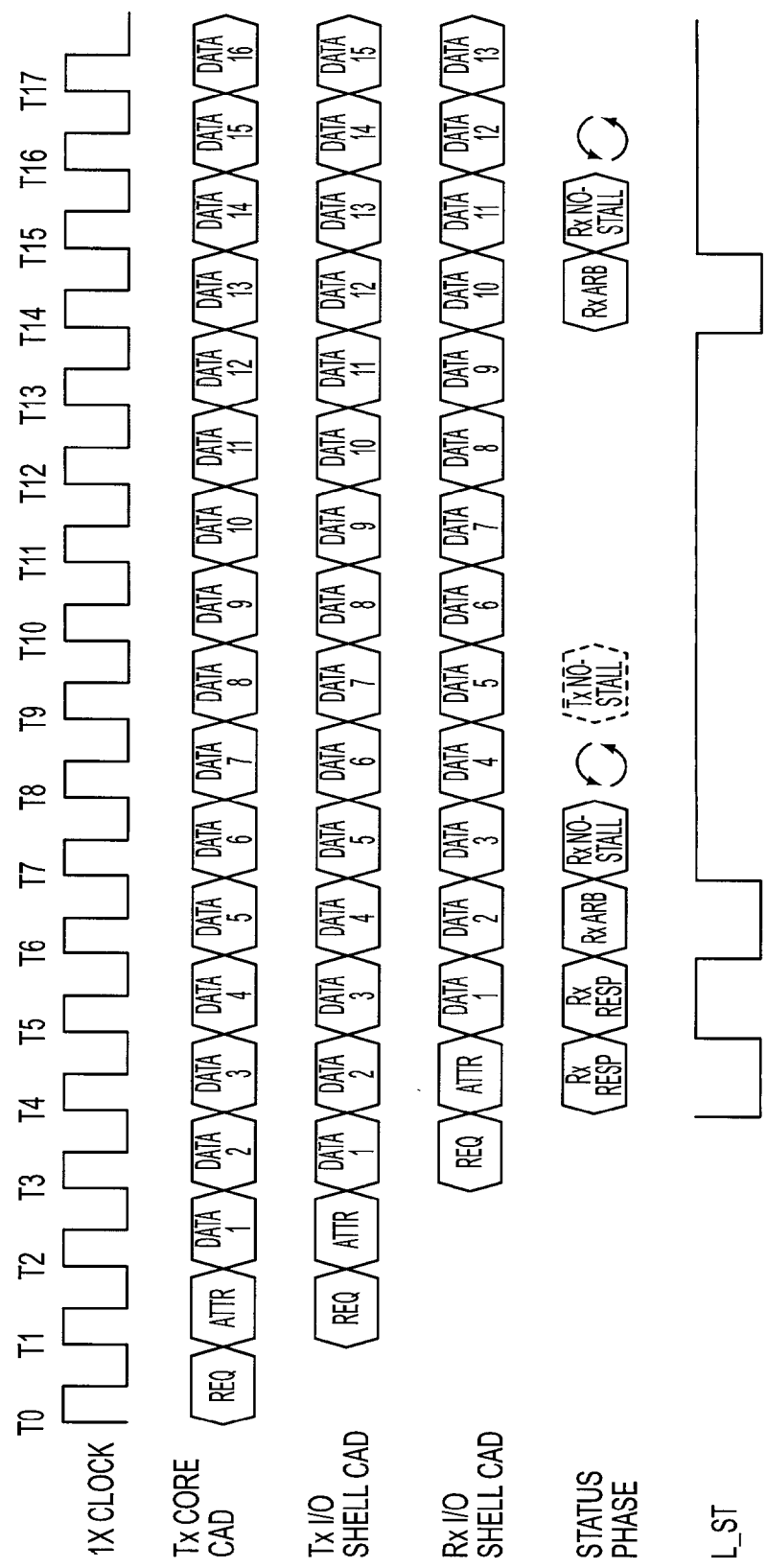
FIGS. 7–10 are timing diagrams illustrating the timing of exemplary arbitration requests in accordance with the invention.

Once there is an established master and slave, there are certain phases where arbitration requests may be issued on the time-multiplexed link bus status line L_ST. This arbitration request must be observed in the core logic of both the master and the slave before it is recognized. As arbitration may be a time critical path in the core logic, ample time is provided for the arbitration request to be recognized in the core. Referring to FIG. 7, the arbitration request is issued at T6 by the slave, it will be captured in the master I/O shell at T7, then sent to the core logic in T8, where a logic decision may be made by T9. Consequently, the arbitration request is not considered observed until at least three clocks after it was issued.

The link bus protocol also supports the issuance of arbitration request between transfers. Just as a link bus master may be parked on command/address/data L_CAD, the link bus slave may be parked on the link bus status L_ST. During this time the link bus is between transfers. When between transfers, the link bus slave may drive the status line L_ST active to indicate that it requests the bus. There is a time lag between when the master initiates a transfer, and when the slave detects that a transfer is in progress. To ensure that a master has not initiated another transfer before the slave detects that the bus is no longer idle, there are a minimum number of clocks before a change in bus ownership can be recognized. As will become apparent, ample time is given to process the arbitration request.

Figure 8:
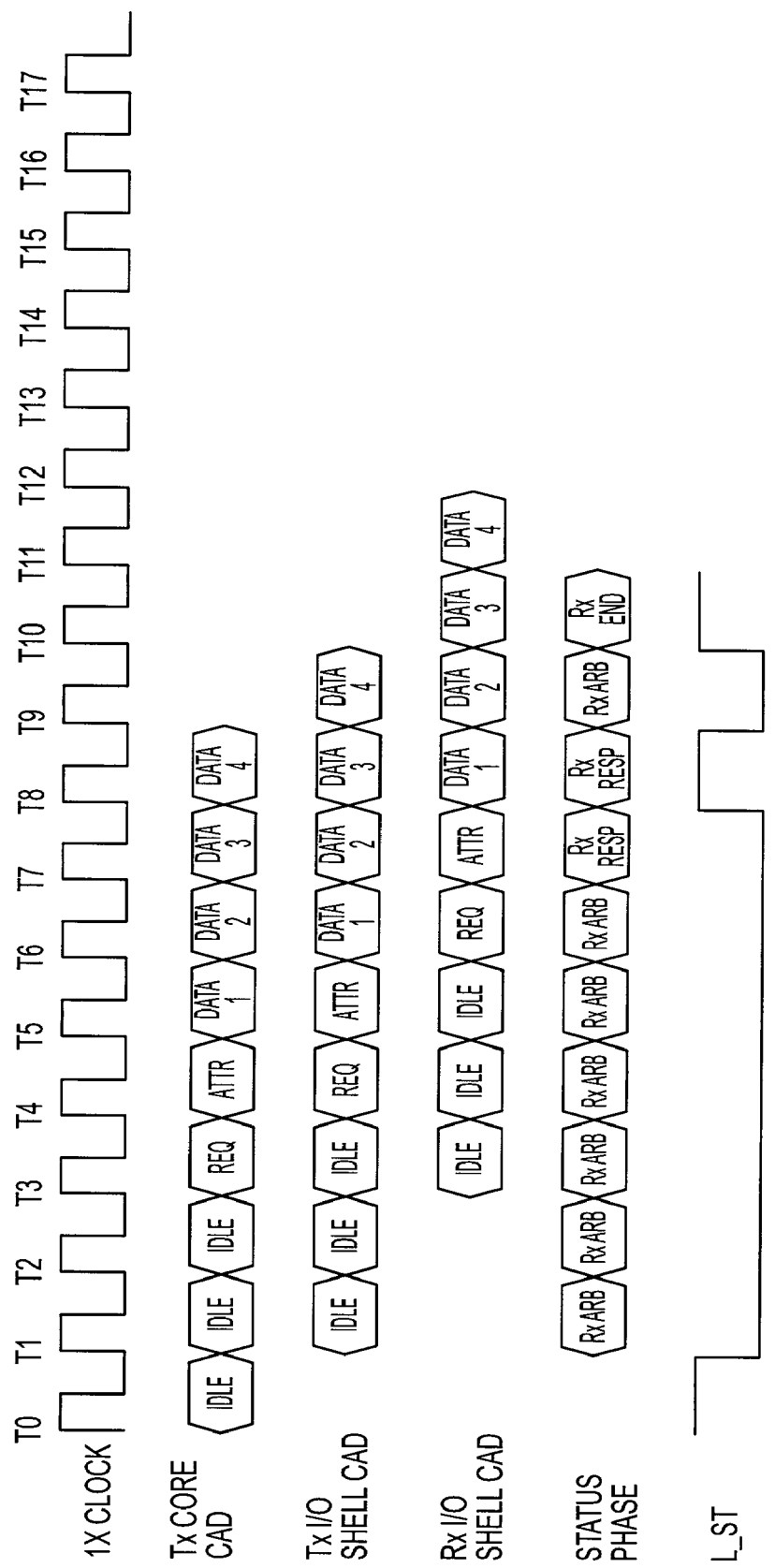

FIG. 8 illustrates the worst arbitration latency where a target device requests to be a master, but loses. At T0 the bus is in an idle state, the current bus master is parked on the bus. At T1, the slave drives the link bus status line L_ST to indicate that it wishes to be the bus master. The master observes the request in its I/O shell at T2, at T3 the arbitration request is captured in the master's core logic. Because arbitration may be a long path, the arbitration request is not processed until it is captured in the core logic at T3. At T4 a decision can be made as to whether the bus ownership can be relinquished, however, by this time the current bus master has already issued a new request at T3, which is too late to change bus ownership. The slave does not actually recognize that a new transfer request has been issued until T7 in the core, at this time it realizes that the arbitration request was not recognized in time. From this example, it can be established that the slave must wait a minimum of six clocks from the time an arbitration request is issued at T1, until it observes an idle bus condition at T7, before it can become the bus master. On the other hand, the current bus master decision point is at T4, if no transfers were pending, it can tristate the bus at T6, allowing the new bus master to drive the bus at T7.

Figure 9:
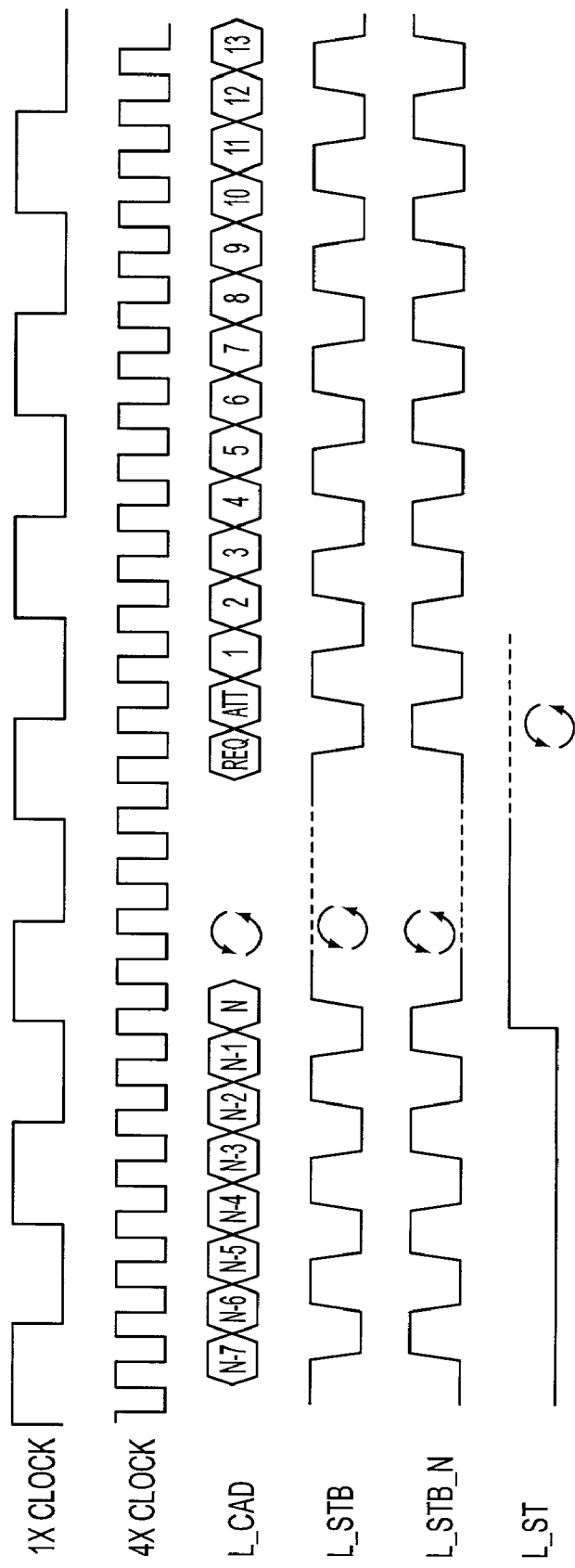
Figure 10:
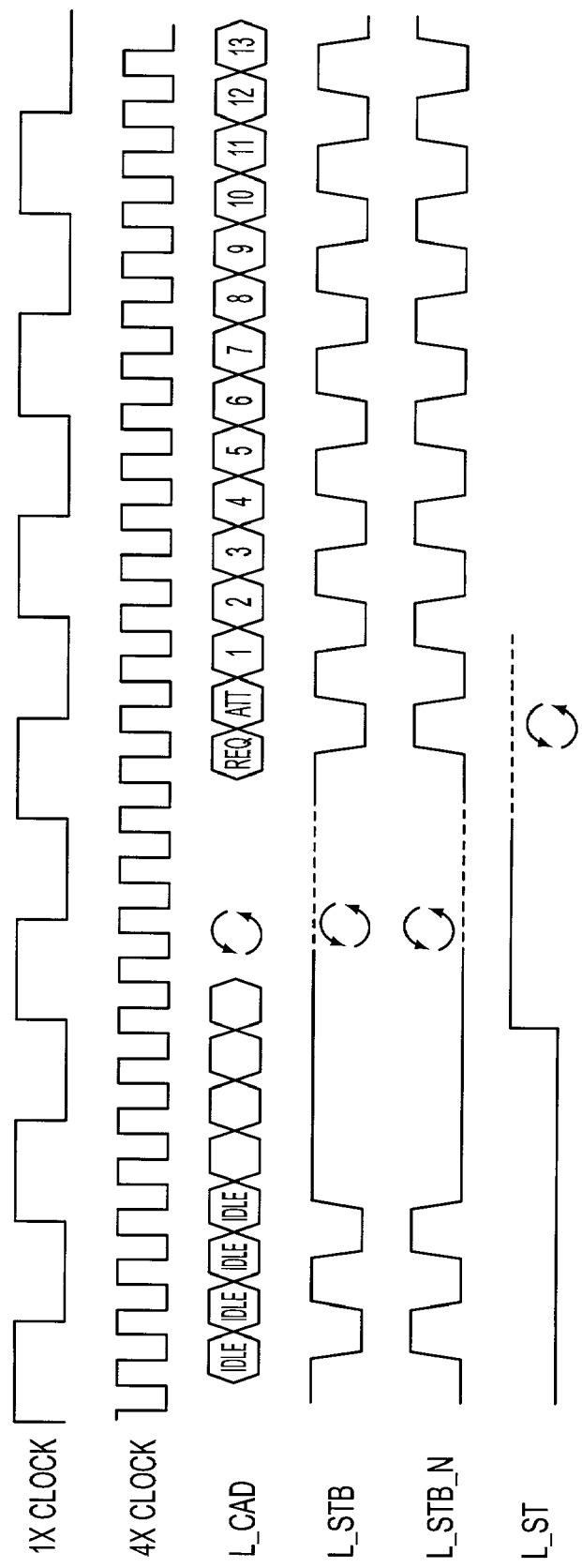

Exemplary timing of the arbitration methods of the invention are illustrated in FIGS. 9 and 10. FIG. 9 illustrates the bus turn-around when ownership of the bus transitions immediately after a transfer completes. FIG. 10 illustrates a bus turn-around after a device has been parked on the bus. Notice that when parked, the current master issues one IDLE command then leaves the data strobes in a neutral position. The parked master drives the strobes L_STB_, L_STB_N, but does not toggle them. This keeps the flip-flops in the target I/O shell clock domain in a known (IDLE) state, allowing the detection of new commands by looking for a change in state of these flops (as is described in application Ser. No. 07/730,775, now U.S. Pat. No. 6,651,122, entitled "Method Of Detecting A Source Strobe Event Using Change Detection".

Now that the basic functions and timing of an exemplary link bus and link bus protocol have been described, the following now describes the format and content of the information packets transmitted over the link bus. One packet of information is the command packet. A command packet is issued by the current link bus master and may include information such as command, address, transfer count, as well as other attributes needed in the system. An exemplary command packet format is illustrated below in Table III. It should be noted that the formatting illustrated in Table III (and Tables IV–X) are examples of the type of format/content that may be used to implement the link bus and link bus protocol. Specific bit fields or sizes of the fields are not given in the Tables because the invention is not limited to any specific field size or position (i.e., bit position) within the packet.

TABLE III

| Field | Description |
| --- | --- |
| Command | Bus Command |
| Address | During memory transactions this field represents a portion of the address. |
| Count/Enable | During block transfers, this field represents the number bytes to transfer. During partial transfers this field represents byte enables. |
| Command attribute | The command attribute field is defined differently for split completion commands and all other commands. For split completion commands this field indicates the completion status of an earlier requested transfer. For all other commands the field indicates transfer attributes of the current request. |

As can be seen from Table III, an exemplary command packet may include command, address, transfer count or byte enable and attribute fields. Exemplary commands that can occupy the command field are illustrated below in Table IV. In an exemplary embodiment, the link bus supports split transactions. Thus, the command attribute field is defined differently for split completion commands than all other command requests. Table V illustrates exemplary definitions for the attribute field for all normal commands, while Table VI illustrates exemplary definitions for the attribute field for the split completion command.

TABLE IV

| Command | Description |
| --- | --- |
| Idle | Bus Idle, no requests. All other bits are inactive to conserve power. |
| Split Completion | Split completion reply. Issued in response to a previously issued request to transfer read data, or transfer completion status. |
| Message Read | Message read request such as processor interrupt acknowledge, flush, fence. |
| Message Write | Message write request such as processor special cycles, NOP, interrupt messaging, and error status messaging. |
| Block Memory Read | Request a memory read of e.g., 1 to 4K bytes. Large block memory reads are the preferred transfer method. |
| Block Memory Write | Request a memory write of e.g., 1 to 4K bytes. Byte enables for all requested bytes are assumed active. Large block memory writes are the preferred transfer method |
| Partial Memory Read | Request a memory read of bytes less than the minimum burst size read. |
| Partial Memory Write | Request a memory write of bytes less than the minimum burst size write. |
| Configuration Read | Read Configuration data. Address is encoded similar to PCI Type 1 configuration cycles. The Link target must decode to determine if transfer is target internally or to subordinate bus. |
| Configuration Write | Write Configuration data. Address is encoded similar to PCI Type 1 configuration cycles. The Link target must decode to determine if transfer is target internally or to subordinate bus. |
| I/O Read | I/O read data. |
| I/O Write | I/O write data. |
| Reserved | Reserved Commands. |

TABLE V

| Field | Description |
| --- | --- |
| Relaxed Ordering Rules | Indicates that the target may use relaxed ordering rules to transfer data. |
| No Snoop | Indicates that memory accesses do not need to be snooped. Not valid for non-memory transfers. |
| No Split-Completion | Indicates that no split-completion message is expected by the master. For writes, this indicates that the transfer is posted, and the master assumes the target shall perform the steps necessary to complete it on the subordinate bus. |
| Lock | Indicates the status of bus lock issued by the processor. Only valid during processor initiated transfers. Note this does not lock the link bus, only the target bus subordinate to the link bus. |

TABLE VI

| Field | Description |
| --- | --- |
| Retry | Indicates that the target has retried the transaction. |
| Request Complete | Indicates that the read/write request has completed normally. |
| RD/WR | Indicates that the split completion is issued in response to a read or write request. |
| No Data | Indicates that no data is transferred, and the value of the Count/Enable field is invalid. |
| Split Completion Error | Indicates that an error occurred during the split completion. |
| Split Completion Error Status | Indicates the type of completion error as defined in e.g., PCI-X. |

The address field identifies the address of the target request. The address field is slightly different for each of the commands. Table VII illustrates one way in which the address field may vary dependent upon the command field.

TABLE VII

| Command | Address Field Description |
| --- | --- |
| Idle | All address bits in the low power state. |
| Split Completion. | Copy of the original split-transaction tag issued with the original request. All other bits are reserved. |
| Message Read | See Table VIII |
| Message Write | See Table IX |
| Block Memory Read | Address of the memory request. |
| Block Memory Write | |
| Partial Memory Read | Address of the memory request. |
| Partial Memory Write | |
| Configuration Read | Address of Configuration address register (e.g., I/O register). |
| Configuration Write | |
| I/O Read | Address of the I/O request. |
| I/O Write | |
| Reserved | Reserved. Should be driven to the low power state. |

The address field requires a more detailed definition for message read and write commands. Exemplary address fields for write commands are found in Table VIII, while exemplary address fields for read commands are found in Table IX.

TABLE VIII

| Command | Description |
| --- | --- |
| Shutdown Special Cycle | Processor special cycle |
| Halt Special Cycle | Processor special cycle |

TABLE VIII-continued

| Command | Description |
| --- | --- |
| Stop Clock Grant Special Cycle | Processor special cycle |
| x86 architecture specific | Processor special cycle |
| NOP | No Operation. May be issued from any link device. |
| Interrupt Event | One or more interrupt lines from a satellite have changed states. |
| PERR Event | Change in PERR status. |
| SERR Event | Change in SERR status. |

TABLE IX

| Command | Description |
| --- | --- |
| Interrupt Acknowledge | Processor interrupt acknowledge |
| Flush | Flush buffers |
| Fence | Fence buffers |

In an exemplary embodiment, a split-transaction tag is used to identify the source of a request so that it may be later replied to with a split completion request. The tag is defined to interface with similar tags used for various processors and is described in Table X.

TABLE X

| Field | Description |
| --- | --- |
| Agent Type | Identifies the Agent as a processor, link bus satellite, or link hub. |
| Agent Tag | Identifies a particular request of the initiating Agent. This field is large enough to carry information from the processor cluster, or a PCI-X agent |
| Agent Bus Number | The PCI Bus number of the requesting device |
| Agent Device Number | The PCI device number of the requesting device |
| Agent Function number | The PCI function number of the requesting device |

Now that the exemplary format/content of command packets have been described, the following now describes an exemplary set of rules required to adhere to the link bus protocol. As much of the control information is time multiplexed across the status signal L_ST, there are certain rules that must be observed by the link master and slave to determine when information is valid and when the information can be driven on the link bus. When a device drives the status signal L_ST low, it will always drive it high one clock before tri-stating the signal L_ST.

Another rule governs the response of the target device (i.e., receiver). For example, a response must be issued by the target 1 clock cycle after observing the transfer request in the clock domain. The response must be observed by the master 4 clocks cycles after issuing the transfer request in the clock domain. Otherwise the response will be deemed invalid. In addition, the transfer shall be terminated by the master 1 clock after observing a response retry signal. It should be noted that the link bus protocol requires other rules governing the arbitration and data stalls processes. These rules, however, are not described herein because they are described in the co-pending applications previously identified above.

As noted earlier, the present invention capitalizes on the link bus and the link bus protocol to allow each device connected to a link bus to arbitrate the bus. This decentralized arbitration method alleviates the need to have a dedicated arbitration device in the system because each device is taking part in the arbitration decision process. This reduces the cost of the system by eliminating an unnecessary component. The method of the invention also reduces any latency associated with the arbitration process and bus transactions since it removes additional communications from the bus. As such, the method of the invention also improves overall system performance.

It should be noted that the formats, timings and other definitions describing the link bus and the link bus protocol are mere examples. The invention is not to be limited to the specific examples described herein.

While the invention has been described and illustrated with reference to exemplary embodiments, many variations can be made and equivalents substituted without departing from the spirit or scope of the invention. Accordingly, the invention is not to be understood as being limited by the foregoing description, but is only limited by the scope of the appended claims.

What is claimed is:

1. A bus arbitration method for a processor based system, the system comprising a link bus, said link bus comprising a link bus hub and a plurality of link bus segments, each link bus segment comprising a plurality of lines for communicating commands, addresses, data, and a line for bi-directionally communicating a single-bit link status signal, each link bus segment coupled to said link bus hub and one respective satellite device to form a point-to-point link between said link bus hub and respective satellite device, one of said respective satellite devices being a first device, a processor coupled to said hub device via a processor bus, and a memory device coupled to said link bus hub by a memory bus, said bi-directional line configured to carry arbitration requests bi-directionally between said first device and another respective satellite device, said method comprising the steps of:

issuing, from one of the first device and the hub device, an arbitration request on a portion of said plurality of lines associated with said single-bit link status signal of the link bus;

determining, at the first device and the hub device, whether control of the link bus can be transferred from a bus master to the device issuing the arbitration request; and if it is determined that control of the link bus can be transferred, transferring control of the link bus from the bus master to the device issuing the arbitration request, wherein control of the link bus is granted by the first device and the hub device.

2. The method of claim 1, wherein said determining step comprises:

inspecting an internal arbitration state and an internal status information; and determining if control of the link bus can be transferred based on the inspected internal arbitration state and the inspected internal status information.

3. The method of claim 2, wherein the internal arbitration state comprises a current arbitration state selected from one of:

a park state indicating that there are no requests on the link bus, a grant-self state indicating that a device in control of the link bus is transferring information on the link bus, and a grant-other state indicating that another device is in control of the link bus.

4. The method of claim 2, wherein the internal status information comprises a current status value selected from one of:
   a bus master arbitration request,
   a bus master transfer in progress,
   a bus slave arbitration request, and
   a bus slave transfer in progress.

5. The method of claim 1, wherein said transferring step comprises:
   modifying an internal arbitration state and an internal status information to reflect that the issuing device is a master of the link bus and that the other device connected to the link bus is a slave of the link bus.

6. The method of claim 5, wherein the internal arbitration state information comprises:
   a current arbitration state selected from one of a park state indicating that there are no requests on the link bus,
   a grant-self state indicating that a device in control of the link bus is transferring information on the link bus, and
   a grant-other state indicating that another device is in control of the link bus.

7. The method of claim 6, wherein said modifying step comprises:
   at the first device, changing the internal arbitration state to the grant-self state; and
   at the link bus hub, changing the internal arbitration state to the grant-other state.

8. The method of claim 6, wherein said modifying step comprises:
   at the link bus hub, changing the internal arbitration state to the grant-self state; and
   at the first device, changing the internal arbitration state to the grant-other state.

9. The method of claim 6, wherein said modifying step comprises:
   at the first device, changing the internal arbitration state from the park state to the grant-self state; and
   at the link bus hub, changing the internal arbitration state from the park state to the grant-other state.

10. The method of claim 6, wherein the internal status information comprises a current status value selected from one of:
    a bus master arbitration request,
    a bus master transfer in progress,
    a bus slave arbitration request, and
    a bus slave transfer in progress.

11. The method of claim 10, wherein the internal arbitration state is changed from the park state to the grant-other state if the internal status reflects the bus master arbitration request and not the bus slave arbitration request.

12. The method of claim 10, wherein the internal arbitration state is changed from the park state to the grant-self state if the internal status reflects the bus slave arbitration request.

13. The method of claim 10, wherein the internal arbitration state is changed from the grant-self state to the grant-other state if the internal status reflects the bus slave arbitration request and not the bus slave transfer in progress state.

14. The method of claim 10, wherein the internal arbitration state is changed from the grant-other state to the grant-self state if the internal status reflects the bus slave arbitration request and not the bus master transfer in progress state.

15. The method of claim 10, wherein the internal arbitration state is changed from the grant-other state to the park state if the internal status does not reflect the bus master arbitration request, the bus slave arbitration request and the bus master transfer in progress state.

16. The method of claim 1, wherein the link bus comprises a link bus status line and said issuing step comprises propagating a signal on the link bus status line.

17. The method of claim 1, wherein the link bus comprises a link bus status line and said issuing step comprises time multiplexing an arbitration request signal on the link bus status line.

18. The method of claim 1, wherein said issuing step through said transferring step are performed in accordance with a link bus protocol of the link bus.

19. A method of arbitrating control of a link bus of a computer system, the link bus comprising a link bus hub and a plurality of link bus segments, each link bus segment comprising a plurality of lines for communicating commands, addresses, data, and a line for bi-directionally communicating a single-bit link status signal, each link bus segment coupled to said link bus hub and one respective satellite device to form a point-to-point link between said link bus hub and respective satellite device, said hub device coupled to a processor of said computer system by a processor bus and coupled to a memory device of said computer system by a memory bus, said bi-directional line configured to carry arbitration requests bi-directionally between one satellite device and another satellite device, the link bus being a source strobed bus, said method comprising the steps of:
    time-multiplexing, from one of the satellite device and the hub device, an arbitration request signal on the single-bit link status line;
    detecting, at the other of the satellite device and the hub device, the arbitration request signal;
    determining, at the satellite device and the hub device, whether control of the link bus can be transferred from a bus master to the device issuing the arbitration request; and
    if it is determined that control of the link bus can be transferred, transferring control of the link bus from the bus master to the device issuing the arbitration request, wherein control of the link bus is granted by the satellite device and the hub device.

20. The method of claim 19, wherein said determining step comprises:
    inspecting an internal arbitration state and a status information contained on each of the satellite device and the hub device; and
    determining if control of the link bus can be transferred based on the inspected internal arbitration state and status information.

21. The method of claim 20, wherein the internal arbitration state information comprises a current arbitration state selected from one of:
    a park state indicating that there are no requests on the link bus,
    a grant-self state indicating that a device in control of the link bus is transferring information on the link bus, and
    a grant-other state indicating that another device is in control of the Link bus.

22. The method of claim 20, wherein the internal status information comprises a current status value selected from one of a bus master arbitration request,
    a bus master transfer in progress,
    a bus slave arbitration request, and
    a bus slave transfer in progress.

23. The method of claim 19, wherein said transferring step comprises: modifying internal arbitration state and status information on each of the satellite device and the hub device to reflect that the issuing device is a master of the link bus and that the other device connected to the link bus is a slave of the link bus.

24. The method of claim 23, wherein the internal arbitration state information comprises a current arbitration state selected from one of:
    a park state,
    a grant-self state, and
    a grant-other state.

25. The method of claim 24, wherein said modifying step comprises:
    at the satellite device, changing the internal arbitration state to the grant-self state; and
    at the hub device, changing the internal arbitration state to the grant-other state.

26. The method of claim 24, wherein said modifying step comprises:
    at the hub device, changing the internal arbitration state to the grant-self state; and
    at the satellite device, changing the internal arbitration state to the grant-other state.

27. The method of claim 24, wherein said modifying step comprises:
    at the satellite device, changing the internal arbitration state from the park state to the grant-self state; and
    at the hub device, changing the internal arbitration state from the park state to the grant-other state.

28. The method of claim 24, wherein the internal status information comprises a current status value selected from one of:
    a bus master arbitration request,
    a bus master transfer in progress,
    a bus slave arbitration request, and
    a bus slave transfer in progress.

29. The method of claim 28, wherein the internal arbitration state is changed from the park state to the grant-other state if the internal status reflects the bus master arbitration request and not the bus slave arbitration request.

30. The method of claim 28, wherein the internal arbitration state is changed from the park state to the grant-self state if the internal status reflects the bus slave arbitration request.

31. The method of claim 28, wherein the internal arbitration state is changed from the grant-self state to the grant-other state if the internal status reflects the bus slave arbitration request and not the bus slave transfer in progress state.

32. The method of claim 28, wherein the internal arbitration state is changed from the grant-other state to the grant-self state if the internal status reflects the bus slave arbitration request and not the bus master transfer in progress state.

33. The method of claim 28, wherein the internal arbitration state is changed from the grant-other state to the park state if the internal status does not reflect the bus master arbitration request, the bus slave arbitration request and the bus master transfer in progress state.

34. A processor system comprising:
    a processor;
    a link bus, said link bus comprising a link bus hub and a plurality of link bus segments, each link bus segment comprising a plurality of lines for communicating commands, addresses, data, and a line for bi-directionally communicating a single-bit link status signal, each link bus segment coupled to said link bus hub and one respective satellite device to form a point-to-point link between said link bus hub and respective satellite device, one of said respective satellite devices being a first device, said link bus hub being coupled to said processor via a processor bus, said bi-directional line configured to carry arbitration requests bi-directionally between said first device and another respective satellite device;
    wherein said first device and said link hub arbitrate a control of said link bus by
        issuing, from one of said satellite device and said link hub, an arbitration request on a portion of said plurality of lines associated with said single-bit link status signal of the link bus,
        determining, at the satellite device and said link hub, whether control of said link bus can be transferred from a bus master to the device issuing the arbitration request, and
        transferring control of said link bus from the bus master to the device issuing the arbitration request.

35. The system of claim 34, wherein said satellite device and said link hub determine if control of said link bus should be transferred by inspecting respective internal arbitration state and status information, and determining if control of said link bus can be transferred based on said inspected internal arbitration state and status information.

36. The system of claim 35, wherein said internal arbitration state information comprises a current arbitration state selected from one of:
    a park state indicating that there are no requests on the link bus,
    a grant-self state indicating that a device in control of the link bus is transferring information on the link bus, and
    a grant-other state indicating that another device is in control of the link bus.

37. The system of claim 35, wherein the internal status information comprises a current status value selected from one of:
    a bus master arbitration request,
    a bus master transfer in progress,
    a bus slave arbitration request, and
    a bus slave transfer in progress.

38. The system of claim 34, wherein said link bus is a source strobed bus.

39. The system of claim 38, wherein said arbitration request is issued by time multiplexing an arbitration request signal on said portion of said link bus associated with said single bit link status signal.

40. The system of claim 34, wherein said wherein said satellite device and said link hub transfer control of said link bus by modifying respective internal arbitration state and status information to reflect that the issuing device is a master of the link bus and that the other device connected to the link bus is a slave of the link bus.

41. The system of claim 40, wherein said internal arbitration state information comprises a current arbitration state selected from one of:
    a park state indicating that there are no requests on the link bus,
    a grant-self state indicating that a device in control of the link bus is transferring information on the link bus, and
    a grant-other state indicating that another device is in control of the link bus.

42. The system of claim 41, wherein said satellite device modifies its internal arbitration state and status information by changing its internal arbitration state to the grant-self state, and wherein said link hub modifies its internal arbitration state and status information by changing its internal arbitration state to the grant-other state.

43. The system of claim 41, wherein said satellite device modifies its internal arbitration state and status information by changing its internal arbitration state to the grant-other state, and wherein said link hub modifies its internal arbitration state and status information by changing its internal arbitration state to the grant-self state.

44. The system of claim 41, wherein said internal status information comprises a current status value selected from one of a bus master arbitration request, bus master transfer in progress, bus slave arbitration request, and bus slave transfer in progress.

45. The system of claim 44, wherein said internal arbitration state is changed from the park state to the grant-other state if said internal status reflects the bus master arbitration request and not the bus slave arbitration request.

46. The system of claim 44, wherein said internal arbitration state is changed from the park state to the grant-self state if said internal status reflects the bus slave arbitration request.

47. The system of claim 44, wherein said internal arbitration state is changed from the grant-self state to the grant-other state if said internal status reflects the bus slave arbitration request and not the bus slave transfer in progress state.

48. The system of claim 44, wherein said internal arbitration state is changed from the grant-other state to the grant-self state if said internal status reflects the bus slave arbitration request and not the bus master transfer in progress state.

49. The system of claim 44, wherein said internal arbitration state is changed from the grant-other state to the park state if said internal status does not reflect the bus master arbitration request, the bus slave arbitration request and the bus master transfer in progress state.

50. A processor based system comprising:
   a processor;
   a link bus, said link bus comprising a link bus hub and a plurality of link bus segments, each link bus segment comprising a plurality of lines for communicating commands, addresses, data, and a line for bi-directionally communicating a single-bit link status signal, each link bus segment coupled to said link bus hub and one respective satellite device to form a point-to-point link between said link bus hub and respective satellite device, one of said respective satellite device being a first device, said bi-directional line configured to carry arbitration requests bi-directionally between said first device and another respective satellite device, said link bus hub being coupled to said processor via a first bus;
   wherein
      said first device multiplexes an arbitration signal on a portion of said lines associated with said single-bit link bus status signal in accordance with a link bus protocol to become a master of said link bus during transmissions to said link hub, and
      said link bus hub multiplexes another arbitration signal on said portion of said lines associated with said single-bit link bus status signal in accordance with said link bus protocol to become a master of said link bus during transmissions to said first device.

51. The system of claim 50, wherein said link bus is a source strobed bus.

52. The system of claim 51, wherein said portion of said lines associated with said single-bit link bus status signal link bus status line is used to transmit status information between said link hub and said satellite device.

53. The system of claim 50, wherein said link bus is a quad pumped source strobed bus.

54. The system of claim 50, wherein said link bus is a double pumped source strobed bus.

55. The system of claim 50, wherein said arbitration signals are time multiplexed on said portion of said lines associated with said single-bit link bus status signal during a predetermined time window.

* * * * *